(12) United States Patent
Sugiyama

(10) Patent No.: US 9,001,278 B2
(45) Date of Patent: Apr. 7, 2015

(54) IMAGE DISPLAY APPARATUS

(75) Inventor: Nobuo Sugiyama, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 209 days.

(21) Appl. No.: 13/042,971

(22) Filed: Mar. 8, 2011

(65) Prior Publication Data

US 2011/0228179 A1 Sep. 22, 2011

(30) Foreign Application Priority Data

Mar. 19, 2010 (JP) .................................. 2010-064428

(51) Int. Cl.
  *G02F 1/1335* (2006.01)
  *G02F 1/13363* (2006.01)
  *G02B 27/26* (2006.01)
  *H04N 13/04* (2006.01)
  *G02B 5/30* (2006.01)

(52) U.S. Cl.
  CPC .......... *G02F 1/13363* (2013.01); *G02B 5/3083* (2013.01); *G02B 27/26* (2013.01); *G02F 2001/133631* (2013.01); *H04N 13/0422* (2013.01); *H04N 13/0434* (2013.01); *H04N 13/0459* (2013.01)

(58) Field of Classification Search
  CPC ............................ H04N 9/3197; G02F 1/1335
  USPC .............................. 349/5–9, 15, 11, 107–109
  See application file for complete search history.

(56) References Cited

U.S. PATENT DOCUMENTS

| 6,089,718 A | 7/2000 | Hashizume | |
|---|---|---|---|
| 7,623,089 B2* | 11/2009 | Sato | 345/8 |
| 2002/0126228 A1* | 9/2002 | Yajima et al. | 349/8 |
| 2008/0278639 A1* | 11/2008 | Hamagishi | 349/8 |
| 2009/0135316 A1* | 5/2009 | Horikoshi | 349/5 |

FOREIGN PATENT DOCUMENTS

| JP | A-07-318884 | 12/1995 |
|---|---|---|
| JP | A-2001-174750 | 6/2001 |
| JP | A-2001-186545 | 7/2001 |
| JP | A-2005-43913 | 2/2005 |

* cited by examiner

*Primary Examiner* — Dung Nguyen
(74) *Attorney, Agent, or Firm* — Oliff PLC

(57) ABSTRACT

An image display apparatus includes a first optical modulation device and a second optical modulation device configured to emit linearly polarized lights whose polarization directions are perpendicular to each other, first pixels and second pixels are arranged in each of the first optical modulation device and second optical modulation device, retardation layers are disposed on the light emission side of the first pixels or second pixels, the retardation layers configured to convert one linearly polarized light of the linearly polarized lights into the other linearly polarized light. Either arrangements of the first pixels and the second pixels or arrangements of the retardation layers is set so as to be the same in the first optical modulation device and the second optical modulation device, and the other is set so as to be the reverse in the first optical modulation device and the second optical modulation device.

8 Claims, 9 Drawing Sheets

| Pixels without phase difference layers | Left | Right |
|---|---|---|
| L image   Red S polarization | Transmitted | Blocked |
| R image   Green P polarization | Blocked | Transmitted |
| L image   Blue S polarization | Transmitted | Blocked |

FIG. 6A

| Pixels with phase difference layers | Left | Right |
|---|---|---|
| R image   Red P polarization | Blocked | Transmitted |
| L image   Green S polarization | Transmitted | Blocked |
| R image   Blue P polarization | Blocked | Transmitted |

FIG. 6B

IMAGE DISPLAY APPARATUS

CROSS-REFERENCE

The entire disclosure of Japanese Patent Application No. 2010-064428 filed Mar. 19, 2010 is expressly incorporated by reference herein.

BACKGROUND

1. Technical Field

The present invention relates to an image display apparatus.

2. Related Art

Heretofore, an image display apparatus which synthesizes R (red), G (green), and B (blue) color lights modulated by three optical modulation devices each having a liquid crystal panel, and the like, using a color synthesis optical device, and projects the synthesized color light onto a screen, allowing an observer to view a projection image on the screen stereoscopically, has been known (for example, refer to JP-A-2001-174750).

With the image display apparatus described in JP-A-2001-174750, the three optical modulation devices carry out an alternate switching between a first period in which a left eye image light is formed and a second period in which a right eye image light is formed.

Also, with the image display apparatus, a polarizing filter or the like is provided on the optical path downstream side of the color synthesis optical device, whereby each image light emitted from the color synthesis optical device is converted into a predetermined polarization condition in the first period, and converted into a polarization condition differing from the predetermined polarization condition in the second period.

Then, the observer views the projection image stereoscopically by visually perceiving only each image light (left eye image light) in the predetermined polarization condition with the left eye, and visually perceiving each image light (right eye image light) in the polarization condition differing from the predetermined polarization condition with the right eye, through polarized glasses.

Meanwhile, a technology which, to synthesize each color light in a color synthesis optical device, controls a loss of the quantity of each color light utilizing the characteristics of an S polarized light and P polarized light has also been known (for example, refer to JP-A-2005-43913).

With the technology described in JP-A-2005-43913, a configuration is such that a G color light enters as the P polarized light, and each of R and B color lights enters as the S polarized light, on a pair of dielectric multilayer films crossing in an approximate X-shape in the color synthesis optical device.

That is, as the G color light enters on the pair of dielectric multilayer films as the P polarized light, it is effectively transmitted through the pair of dielectric multilayer films, reducing the loss of the light quantity. Meanwhile, as each of the R and B color lights enters on the pair of dielectric multilayer films as the S polarized light, it is effectively reflected by the pair of dielectric multilayer films, reducing the loss of the light quantity.

However, the image display apparatus described in JP-A-2001-174750 is configured on the assumption that the image lights emitted from the three optical modulation devices are of the same linear polarization.

For this reason, when the technology described in JP-A-2005-43913 is applied to the image display apparatus described in JP-A-2001-174750, the following problem will arise.

That is, as the image light emitted from one optical modulation device, among the three optical modulation devices, and the image light emitted from another optical modulation device are linearly polarized lights whose polarization directions are perpendicular to each other, even by converting the polarization conditions with the polarizing filter or the like, it is not possible to convert all the polarization conditions into the same polarization condition.

For example, in the first period, the left eye image light emitted from one optical modulation device is converted into the predetermined polarization condition, and the left eye image light emitted from another optical modulation device is converted into the polarization condition differing from the predetermined polarization condition, by the polarizing filter or the like. For this reason, in the first period, the observer, while visually perceiving the left eye image light emitted from the one optical modulation device with the left eye, visually perceives the left eye image light emitted from the other optical modulation device with the right eye, through the polarized glasses. The same also applies in the second period.

SUMMARY

An advantage of some aspects of the invention is to provide an image display apparatus which can effectively cause an image to be visually perceived.

An image display apparatus according to one aspect of the invention includes a first optical modulation device and a second optical modulation device configured to emit an image light formed as linearly polarized lights whose polarization directions are perpendicular to each other. First pixels forming a first image light and second pixels forming a second image light are arranged in at least one direction in each of the first optical modulation device and the second optical modulation device. Retardation layers are disposed on the light emission side of the first pixels or second pixels, the retardation layers configured to convert one linearly polarized light of the linearly polarized lights into the other linearly polarized light. An arrangement of the first pixels and the second pixels in the first optical modulation device is set so as to be the reverse of an arrangement of the first pixels and the second pixels in the second optical modulation device, and arrangements of the retardation layers in the first optical modulation device and the second optical modulation device are set so as to be the same as each other.

The image display apparatus according to the aspect of the invention includes the first optical modulation device, the second optical modulation device, and the retardation layers. Because of this, in the event that the retardation layers are disposed on the light emission side of the second pixels in the first optical modulation device, in the second optical modulation device, the retardation layers are disposed on the light emission side of the first pixels. For this reason, a light emitted from the second pixels on the first optical modulation device side and a light emitted from the first pixels on the second optical modulation device side are converted in polarization direction by the retardation layers and emitted. When the retardation layers are disposed on the light emission side of the second pixels in the first optical modulation device, these relationships are reversed.

Because of this, it is possible to make the polarization directions of the first pixels and second pixels the same as each other, and make the polarization direction of the first image light and the polarization direction of the second image light different from one another.

For example, by taking the first image light and second image light as a left eye image light and right eye image light respectively, an observer can effectively view an image stereoscopically by visually perceiving only the left eye image light with the left eye, and visually perceiving only the right eye image light with the right eye, through polarized glasses.

Also, as it is not necessary to alternately form the first image light and second image light with a time division, and both the first image light and second image light are constantly formed, it is more possible to cause a natural image with no flicker to be visually perceived in comparison with, for example, a heretofore known configuration wherein the first image light and second image light are alternately formed in this way.

An image display apparatus according to another aspect of the invention includes a first optical modulation device and a second optical modulation device configured to emit an image light formed as linearly polarized lights whose polarization directions are perpendicular to each other. First pixels forming a first image light and second pixels forming a second image light are arranged in at least one direction in each of the first optical modulation device and the second optical modulation device. Retardation layers are disposed on the light emission side of the first pixels or second pixels, the retardation layers configured to convert one linearly polarized light of the linearly polarized lights into the other linearly polarized light. An arrangement of the first pixels and the second pixels in the first optical modulation device is set so as to be the same as an arrangement of the first pixels and the second pixels in the second optical modulation device, and arrangements of the retardation layers in the first optical modulation device and second optical modulation device are set so as to be the reverse of each other.

The image display apparatus according to the aspect of the invention includes the first optical modulation device, the second optical modulation device, and the retardation layers. Because of this, in the same way as the previously described image display apparatus, it is possible to make the polarization directions of the first image light and the second image light the same as each other, and make the polarization direction of the first image light and the polarization direction of the second image light different from one another. This achieves working effects the same as those of the previously described image display apparatus.

BRIEF DESCRIPTION OF THE DRAWINGS

The invention will be described with reference to the accompanying drawings, wherein like numbers reference like elements.

FIGS. 6A and 6B are diagrams illustrating a transmission and block of images according to the first embodiment.

DESCRIPTION OF EXEMPLARY EMBODIMENTS

First Embodiment

Hereafter, a description will be given, based on the drawings, of a first embodiment of the invention.

Configuration of Image Display Apparatus

Figure 1:
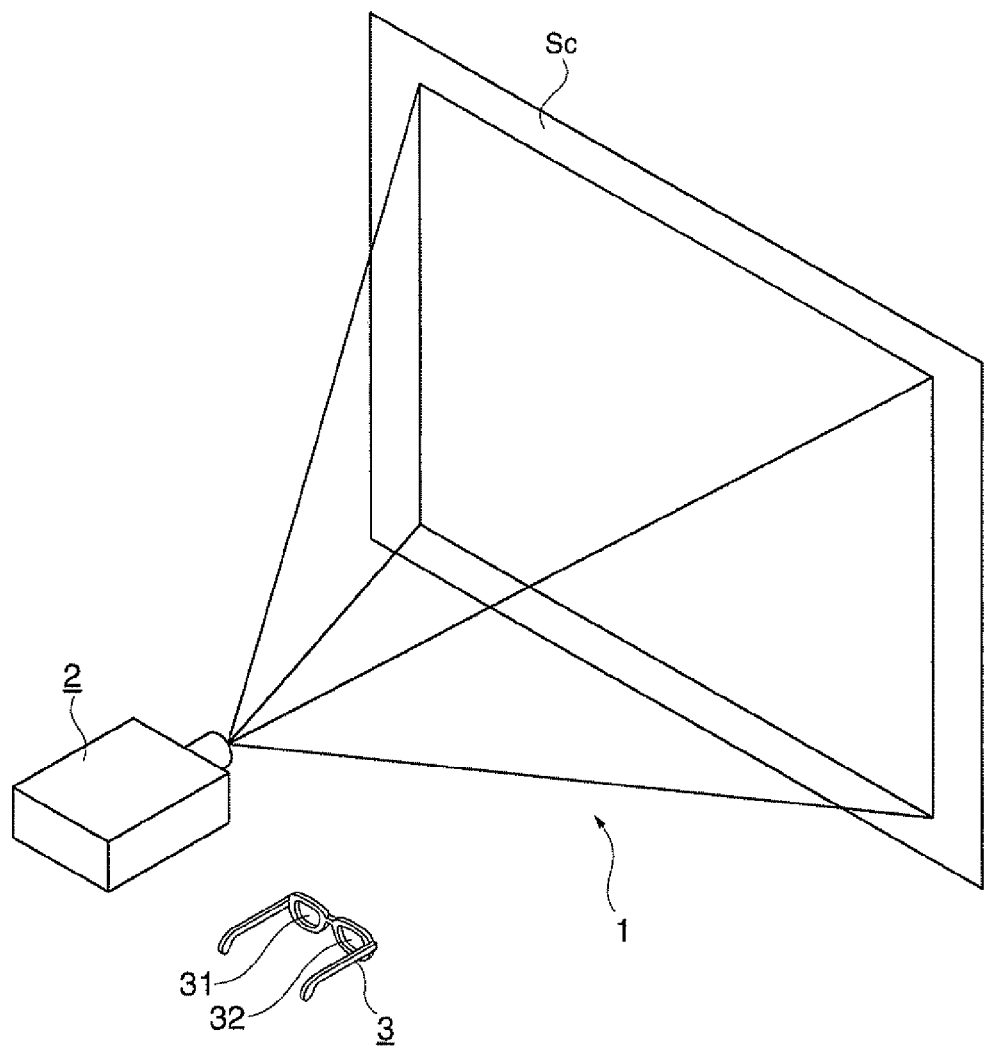
FIG. 1 is a perspective view showing a usage form of an image display apparatus according to a first embodiment.

FIG. 1 is a perspective view showing a usage form of an image display apparatus 1 according to the first embodiment.

The image display apparatus 1, as well as displaying a projection image on a reflective screen Sc, allows an observer to view the projection image stereoscopically. The image display apparatus 1 includes a projector 2 as an image display apparatus main body, and polarized glasses 3 as an image selection device, as shown in FIG. 1.

Configuration of Projector

Figure 2:
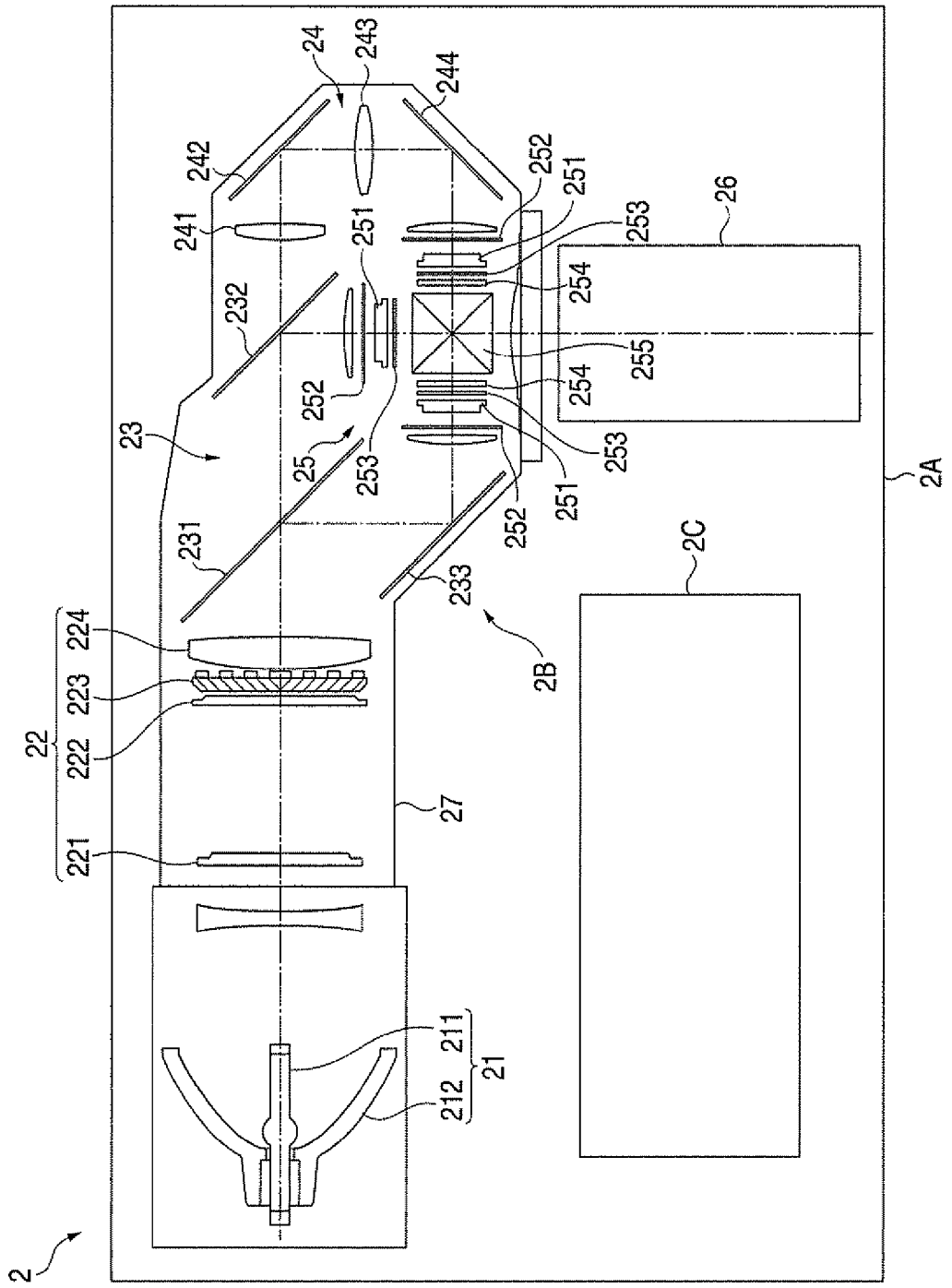
FIG. 2 is a plan view schematically showing an internal configuration of a projector according to the first embodiment.

FIG. 2 is a plan view schematically showing an internal configuration of the projector 2.

The projector 2 is largely configured of an exterior housing 2A configuring an exterior, and an optical unit 2B and control device 2C (FIG. 2) housed inside the exterior housing 2A, as shown in FIG. 1 or 2.

The optical unit 2B, by being controlled by the control device 2C, forms and projects an image based on image information (image data).

The optical unit 2B, as shown in FIG. 2, includes a light source device 21 having a light source lamp 211 and a reflector 212, an illumination optical device 22 having lens arrays 221 and 222, a polarization conversion element 223, and a superimposing lens 224, a color separation optical device 23 having dichroic mirrors 231 and 232 and a reflecting mirror 233, a relay optical device 24 having an incidence side lens 241, a relay lens 243, and reflecting mirrors 242 and 244, an optical device 25 having three liquid crystal panels 251, three incidence side polarizing plates 252, three emission side polarizing plates 253, two ½ wavelength plates 254, and a cross dichroic prism 255 as a color synthesis optical device, a projection lens 26 as a projection optical device, and an optical component housing 27 which, as well as housing therein each heretofore described optical component 21 to 25, supports the projection lens 26.

Then, in the optical unit 2B, with the heretofore described configuration, luminous fluxes emitted from the light source device 21 and passing through the illumination optical device 22 are separated into three color lights, R, G, and B, by the color separation optical device 23. Also, the separated color lights are modulated one by each liquid crystal panel 251 in accordance with the image information. The modulated color lights (image lights) are synthesized by the prism 255, and projected onto the screen Sc by the projection lens 26.

Figure 3:
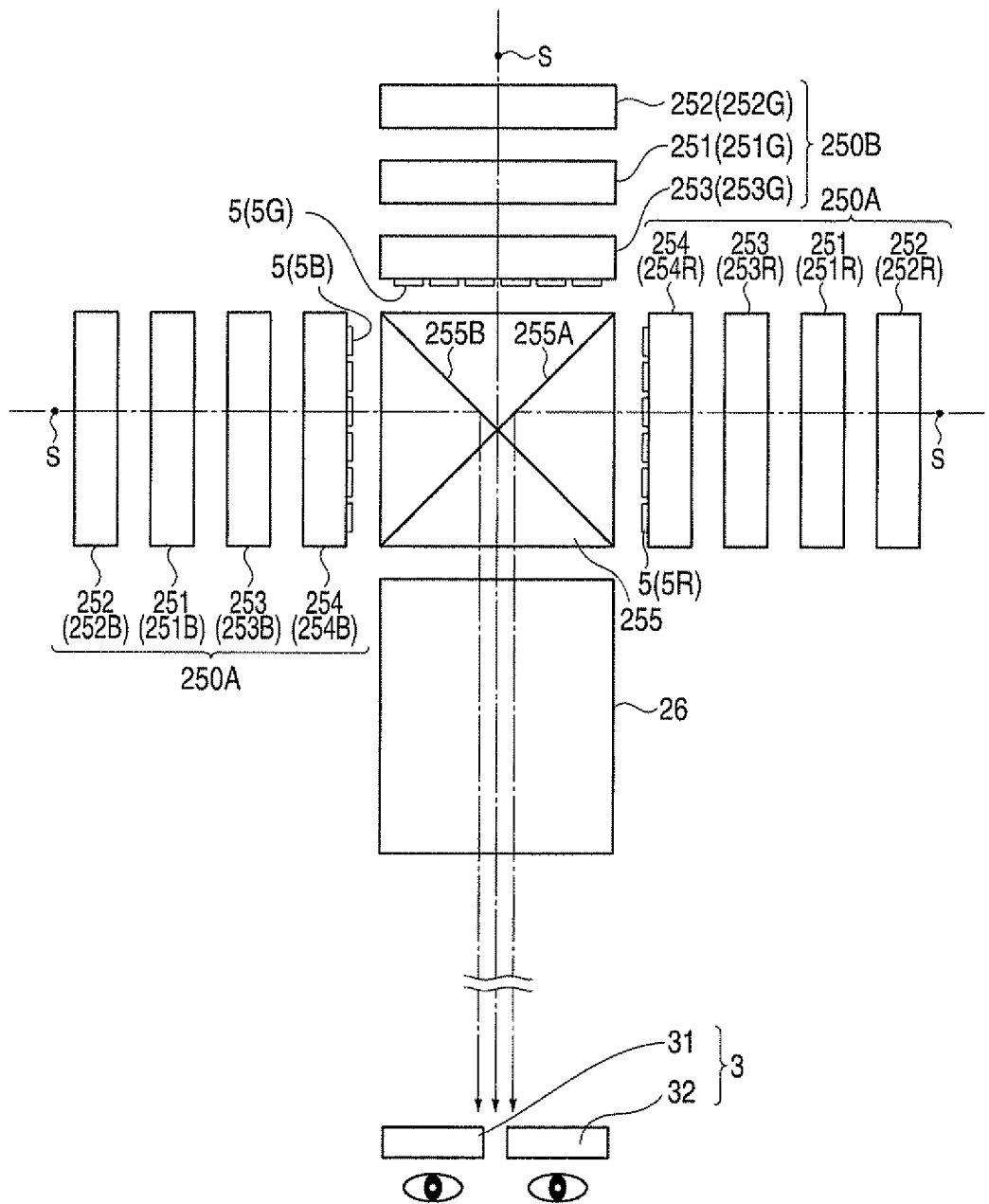
FIG. 3 is an enlarged view of one portion of FIG. 2, showing a polarization condition of each color light passing through an optical device.

FIG. 3 is an enlarged view of one portion of FIG. 2, showing a polarization condition of each color light passing through the optical device 25.

In the embodiment, the R, G, and B color lights entering on the optical device 25 travel while changing the polarization directions, as will be shown hereafter.

Hereafter, a linearly polarized light having a polarization direction perpendicular to the plane in FIG. 2 will be described as a first linearly polarized light S, and a linearly polarized light having a polarization direction perpendicular to the polarization direction of the first linearly polarized light S and parallel to the plane in FIG. 2 will be described as a second linearly polarized light P.

Also, hereafter, to simplify the description, the R color light side liquid crystal panel 251, incidence side polarizing plate 252, emission side polarizing plate 253, and ½ wavelength plate 254 will be described as 251R, 252R, 253R, and 254R respectively (refer to FIG. 3). The G color light side and the B color light side ones will also be described in the same way (refer to FIG. 3).

Firstly, almost all of the luminous flux emitted from the light source device 21 is converted into the first linearly polarized lights S by the polarization conversion element 223. Then, the luminous flux emitted from the polarization conversion element 223 is separated into the individual color lights by the color separation optical device 23, and as shown in FIG. 3, the individual color lights enter on the optical device 25 as the first linearly polarized lights S.

Each of the three incidence side polarizing plates 252 has a transmission axis whose direction is approximately the same as the polarization direction of the luminous fluxes aligned by the polarization conversion element 223. That is, the individual color lights (first linearly polarized lights S) entering on the optical device 25 are emitted from the corresponding incidence side polarizing plates 252, as the first linearly polarized lights S, without being changed in polarization direction.

Each of the three emission side polarizing plates 253 has a transmission axis rotated 90 degrees around an illumination optical axis A (FIG. 2) from the transmission axis of each incidence side polarizing plate 252. That is, the individual color lights emitted from the corresponding incidence side polarizing plates 252 and entering on the corresponding emission side polarizing plates 253 via the corresponding liquid crystal panels 251 are emitted from the corresponding emission side polarizing plates 253 as the second linearly polarized lights P.

Herein, on the R and B color light sides, the ½ wavelength plates 254 are disposed between each corresponding emission side polarizing plate 253R and 253B and the prism 255, as shown in FIG. 2 or 3.

That is, only the R and B color lights, among the R, G, and B color lights (second linearly polarized lights P) emitted from the corresponding emission side polarizing plates 253, are converted into the first linearly polarized lights S by the ½ wavelength plates 254R and 254B.

Then, retardation layers 5 are partially disposed on each of the color light emission surfaces of the ½ wavelength plates 254R and 254B and emission side polarizing plate 253G.

Hereafter, to simplify the description, the R, G, and B side retardation layers 5 will be made retardation layers 5R, 5G, and 5B respectively (refer to FIG. 3).

Each retardation layer 5 converts the polarization direction of an incident light and emits the light. Specifically, each retardation layer 5 converts the color light caused to enter as the first linearly polarized light S into the second linearly polarized light P, and emits the second linearly polarized light P, while it converts the color light caused to enter as the second linearly polarized light P into the first linearly polarized light S, and emits the first linearly polarized light S. Each retardation layer 5 will be described in detail hereafter.

The prism 255, as shown in FIG. 3, has a pair of dielectric multilayer films 255A and 255B crossing in an approximate X-shape in a plan view. One dielectric multilayer film 255A reflects the R color light, while the other dielectric multilayer film 255B reflects the B color light, and the R and B color lights are bent by the respective dielectric multilayer films 255A and 255B, and aligned with a traveling direction of the G color light, thereby synthesizing the three color lights.

Then, each of the R, G, and B color lights emitted from the prism 255 is projected by the projection lens 26.

In the embodiment, each R color light side member 251R, 252R, 253R, and 254R, and each B color side member 251B, 252B, 253B, and 254B, is made a first optical modulation device 250A (FIG. 3), and each G color side member 251G, 252G, and 253G is made a second optical modulation device 250B (FIG. 3).

Configurations of Optical Modulation Devices

Figure 4A:
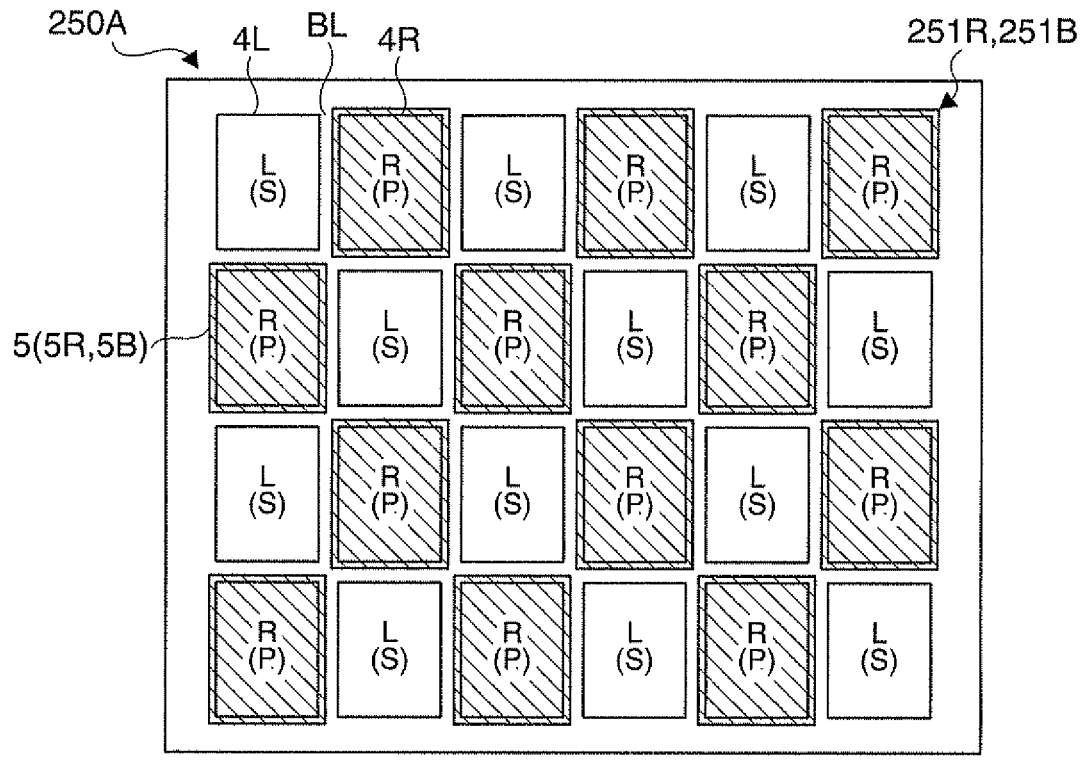
FIGS. 4A and 4B are schematic plan views of configurations of optical modulation devices according to the first embodiment.
Figure 4B:
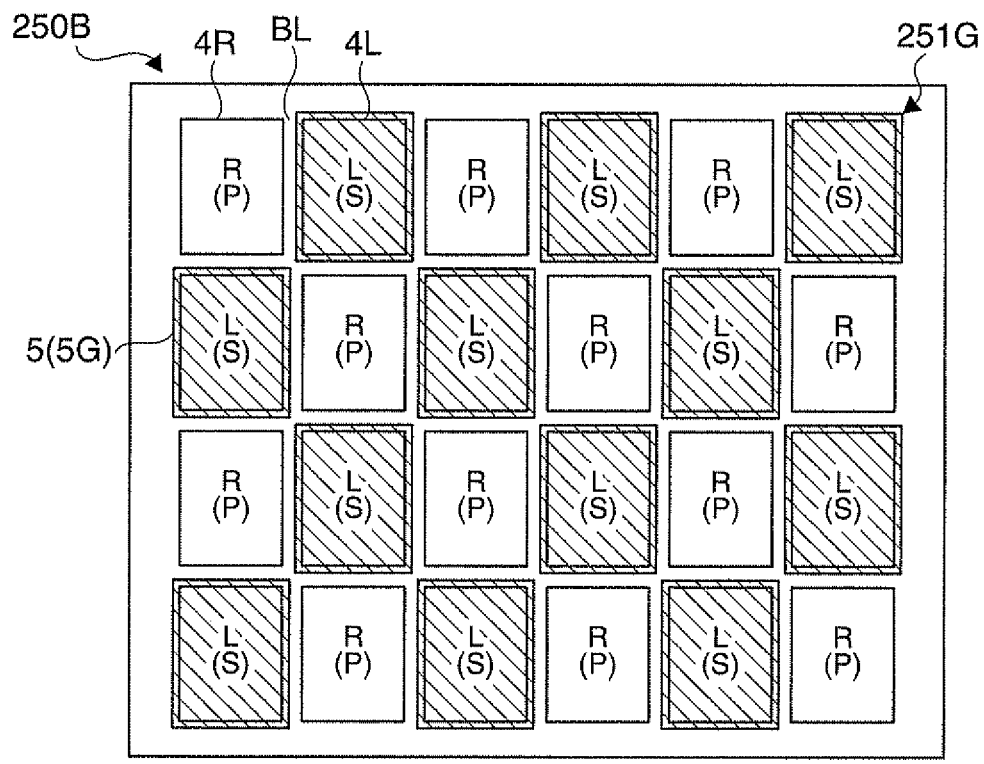

FIGS. 4A and 4B are schematic plan views of configurations of the optical modulation devices 250A and 250B and retardation layers 5. Specifically, FIGS. 4A and 4B are views from the prism 255 side, wherein FIG. 4A is a view of the first optical modulation device 250A and retardation layers 5R or retardation layers 5B, and FIG. 4B is a view of the second optical modulation device 250B and retardation layers 5G.

Hereafter, a description will be given of configurations of each liquid crystal panel 251 and each retardation layer 5, and other configurations will be omitted from the description.

Also, in FIGS. 4A and 4B, to simplify the description, a letter "L" is put inside each of pixels 4L of the liquid crystal panels 251, and a letter "R" is put inside each of pixels 4R. The same also applies in the following drawings. Bracketed letters in FIGS. 4A and 4B indicate the polarization directions of the color lights emitted from the optical modulation devices 250A and 250B. That is, "S" and "P" in FIGS. 4A and 4B indicate the first linearly polarized light S and second linearly polarized light P respectively.

Also, each of FIGS. 4A and 4B, to simplify the description, shows a configuration of each liquid crystal panel 251 wherein the pixels 4L and pixels 4R are each disposed in four rows by six columns.

Configuration of Liquid Crystal Panels

Each liquid crystal panel 251, being a fixed pixel type image formation device, includes a plurality of pixels for left eye 4L (corresponding to first pixels according to some aspects of the invention) displaying images for left eye and a plurality of pixels for right eye 4R (corresponding to second pixels according to some aspects of the invention) displaying images for right eye, and the pixels 4L and 4R are boxed off by a black matrix BL.

The pixels for left eye 4L and pixels for right eye 4R are alternately arranged in all row directions (in FIGS. 4A and 4B, the left-right direction) and all column directions (in FIGS. 4A and 4B, the up-down direction), as shown in FIGS. 4A and 4B.

Also, each pixel 4L and 4R includes a thin film transistor (TFT), which applies a voltage to liquid crystal sealed between a pair of transparent substrates, as a switching element, and a voltage applied to each pixel 4R and 4L as an image signal changes by the TFT being switched, changing the orientation condition of the liquid crystal, and an incident luminous flux is thereby modulated in response to the image signal.

In the liquid crystal panel 251G, as shown in FIG. 4B, the arrangement of the pixels 4L and pixels 4R is the reverse of that in each liquid crystal panel 251R and 251B. That is, in the liquid crystal panel 251G, positions corresponding to the pixels 4L in the liquid crystal panels 251R and 251B are taken up by the pixels 4R, and positions corresponding to the pixels 4R are taken up by the pixels 4L.

Configuration of Retardation Layers

As previously described, the retardation layers 5 are partially disposed on each of the light emission surfaces of the emission side polarizing plate 253G and ½ wavelength plates 254R and 254B, that is, on the light emission side of each liquid crystal panel 251.

The retardation layers 5R and 5B are provided on the light emission side of the pixels 4R in the liquid crystal panels 251R and 251B, as shown in FIG. 4A, and the retardation layers 5G are provided on the light emission side of the pixels 4L in the liquid crystal panel 251G, as shown in FIG. 4B.

As each liquid crystal panel 251R and 251B and the liquid crystal panel 251G have arrangements of the pixels 4L and 4R which are the reverse of each other, as previously described, the arrangement of the retardation layers 5R and 5B and the arrangement of the retardation layers 5G are the same, as shown in FIGS. 4A and 4B.

Figure 5:
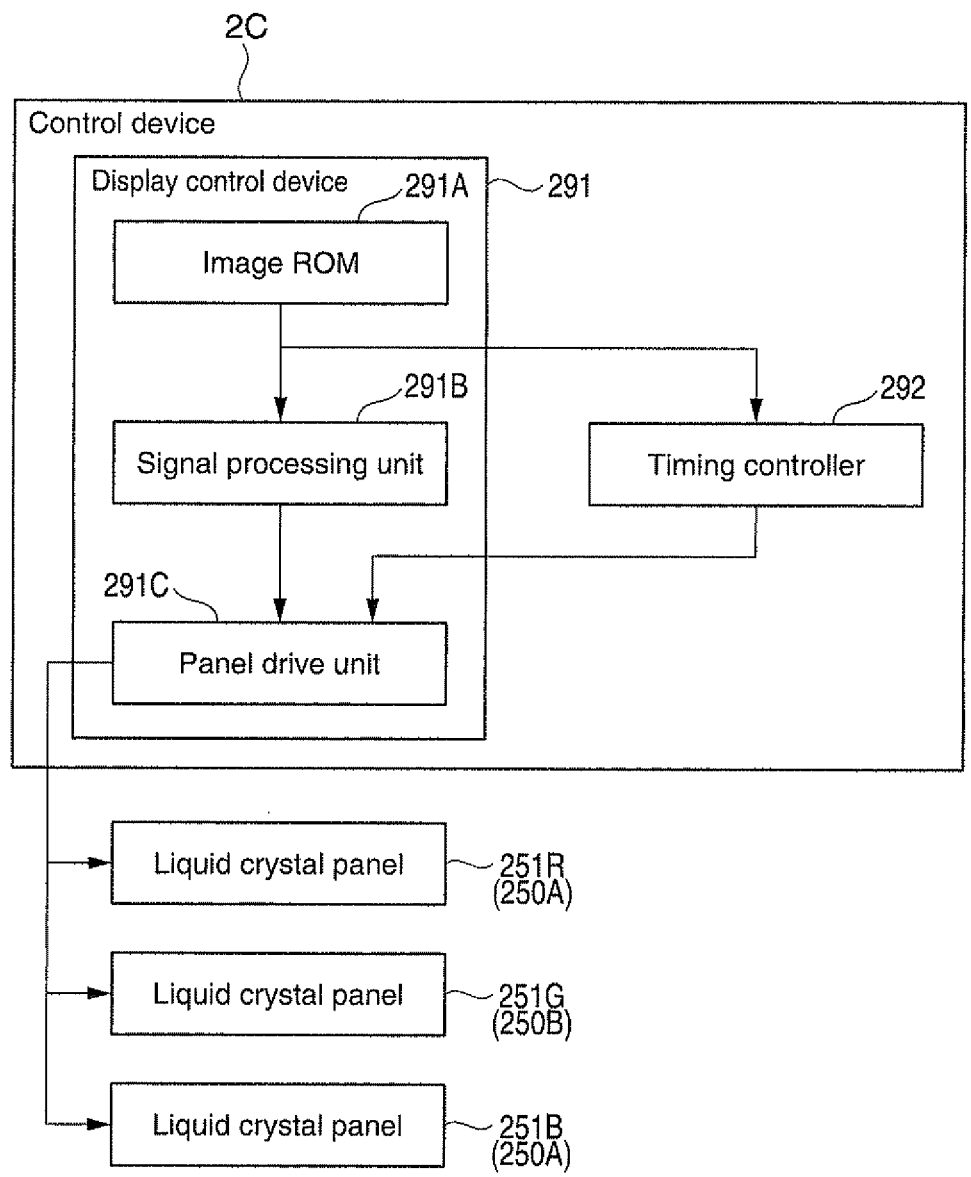
FIG. 5 is a block diagram showing a configuration of a control device according to the first embodiment.

FIG. 5 is a block diagram showing a configuration of the control device 2C.

The control device 2C, having a central processing unit (CPU) or the like, controls the action of each liquid crystal panel 251. The control device 2C, as shown in FIG. 5, includes a display control device 291 and a timing controller 292.

The timing controller 292 reads a synchronization signal included in the image data stored in an image ROM 291A, to be described hereafter, and synchronizes a panel drive unit 291C.

The display control device 291 controls the action of each liquid crystal panel 251. The display control device 291 includes the image ROM (read only memory) 291A, a signal processing unit 291B, and the panel drive unit 291C.

The image ROM 291A stores the image data to be displayed on each liquid crystal panel 251. Herein, the image data are configured of left eye image data and right eye image data. Also, each item of the left eye image data and right eye image data is configured of a per-frame data aggregate. Furthermore, each item of one frame's worth of left eye image data and one frame's worth of right eye image data is configured of an R signal, a G signal, and a B signal.

The signal processing unit 291B reads the image data (left eye image data and right eye image data) stored in the image ROM 291A, as appropriate, converts the image data into the individual color signals, and outputs them to the panel drive unit 291C.

Then, the panel drive unit 291C drives the liquid crystal panels 251 based on the corresponding signals output from the signal processing unit 291B.

Configuration of Polarized Glasses

The polarized glasses 3, being worn by the observer, include a polarizing film for left eye 31 as a first transmission portion and a polarizing film for right eye 32 as a second transmission portion, as shown in FIG. 1 or 3.

The polarizing film for left eye 31 is configured in such away that the transmission axis is in a direction the same as the polarization direction of the first linearly polarized light S, in a condition in which the polarized glasses 3 are worn by the observer in such a way that the polarizing film for left eye 31 and the polarizing film for right eye 32 are placed side by side in a horizontal direction.

The polarizing film for right eye 32 is configured in such away that, in the heretofore described condition, the transmission axis is in a direction the same as the polarization direction of the second linearly polarized light P.

Action of Image Display Apparatus

Next, a description will be given of an action of the image display apparatus 1.

Firstly, the signal processing unit 291B reads the left eye image data and right eye image data from the image ROM 291A, and outputs the R signal, G signal, and B signal configuring each item of the image data to the panel drive unit 291C.

Then, the panel drive unit 291C drives the liquid crystal panels 251R, 251G, and 251B based on the R signal, G signal, and B signal configuring each item of the left eye image data and right eye image data.

At this time, the panel drive unit 291C drives the liquid crystal panel 251R and liquid crystal panel 251B based on the R signal and B signal respectively in such a way that the panels attain the arrangement of the pixels 4L and 4R shown in FIG. 4A. Also, the panel drive unit 291C drives the liquid crystal panel 251G based on the G signal in such a way that the panel attains the arrangement of the pixels 4L and 4R shown in FIG. 4B.

In accordance with the heretofore described action, as shown in FIG. 4A, the image lights emitted from the pixels 4L of the liquid crystal panels 251R and 251B enter on the prism 255 as the first linearly polarized lights S, and the image lights emitted from the pixels 4R of the liquid crystal panels 251R and 251B enter on the prism 255 as the second linearly polarized lights P. Also, as shown in FIG. 4B, the image lights emitted from the pixels 4L, of the liquid crystal panel 251G enter on the prism 255 as the first linearly polarized lights S, and the image lights emitted from the pixels 4R of the liquid crystal panel 251G enter on the prism 255 as the second linearly polarized lights P.

The color light emitted from the pixels 4L of each corresponding liquid crystal panel 251 corresponds to a first image light according to some aspects of the invention, and the color light emitted from the pixels 4R of each corresponding liquid crystal panel 251 corresponds to a second image light according to some aspects of the invention.

FIGS. 6A and 6B are diagrams illustrating a transmission or block of the images through or by the polarized glasses 3. Specifically, FIG. 6A shows a relationship with the pixels 4R and 4L provided with no retardation layer 5, and FIG. 6B shows a relationship with the pixels 4R and 4L provided with the retardation layers 5. "S polarization" and "P polarization" shown in FIGS. 6A and 6B show the "S" and "P" shown in FIGS. 4A and 4B, that is, the polarization directions of each color light which is caused to enter on the prism 255 and reaches the polarized glasses 3.

The polarized glasses 3 transmit or block each color light in the following way in the case of the pixels provided with no retardation layer 5 (the pixels 4L of the liquid crystal panels 251R and 251B, and the pixels 4R of the liquid crystal panel 251G), as shown in FIG. 6A.

As the polarization directions of the color lights emitted from the optical modulation devices 250R and 250B are converted by the ½ wavelength plates 254R and 254B respectively, as previously described, among the individual color lights, one based on the left eye data becomes the first linearly polarized light S, while one based on the right eye data becomes the second linearly polarized light P, and they are projected from the projection lens 26.

That is, the R (red) color light and B (blue) color light forming the images for left eye (L images) caused to enter as the first linearly polarized lights S are transmitted through the polarizing film for left eye 31 and blocked by the polarizing film for right eye 32. Also, the G (green) color light forming the right eye image (an R image) caused to enter as the second linearly polarized light P is blocked by the polarizing film for left eye 31 and transmitted through the polarizing film for right eye 32.

In the case of the pixels provided with the retardation layers 5 (the pixels 4R of the liquid crystal panels 251R and 251B, and the pixels 4L of the liquid crystal panel 251G), the polarized glasses 3 have a transmission and block relationship the reverse of that in the previously described case, as shown in FIG. 6B.

Consequently, as the images for left eye are observed with only the left eye of the observer, and the images for right eye are observed with only the right eye of the observer, the observer can view a stereoscopic image.

According to the first embodiment, there are the following advantages.

In the embodiment, the retardation layers 5R and 5B are disposed on the second image light emission side of the pixels 4R of the first optical modulation device 250A, and in the second optical modulation device 250B, the retardation layers 5G are disposed on the first image light emission side of the pixels 4L. For this reason, the first image lights emitted from the first optical modulation device 250A are emitted while remaining the first linearly polarized lights S, but the second image lights emitted from the first optical modulation device 250A are converted from the first linearly polarized lights S into the second linearly polarized lights P by the retardation layers 5R and 5B, and emitted. Also, the first image light emitted from the second optical modulation device 250B is converted from the second linearly polarized light P into the first linearly polarized light S by the retardation layers 5G, and emitted, while the second image light is emitted while remaining the second linearly polarized light P.

Because of this, it is possible to make the first image lights emitted from the first optical modulation device 250A, and the first image light emitted from the second optical modulation device 250B, the same in polarization direction (the first linearly polarized lights S), make the second image lights emitted from the first optical modulation device 250A, and the second image light emitted from the second optical modulation device 250B, the same in polarization direction (the second linearly polarized lights P), and make the polarization direction of the first image lights and the polarization direction of the second image lights different from one another.

Then, by taking the first image lights and second image lights as a left eye image light and right eye image light respectively, the observer can effectively view the image stereoscopically by visually perceiving only the left eye image light with the left eye, and visually perceiving only the right eye image light with the right eye, through the polarized glasses 3.

Also, as it is not necessary to alternately form the first image lights and second image lights with a time division, and both the first image lights and second image lights are constantly formed, it is more possible to cause a natural image with no flicker to be visually perceived in comparison with, for example, a heretofore known configuration wherein the first image lights and second image lights are alternately formed in this way. As the first image lights and second image lights are not alternately formed with a time division, a luminance loss when time is divided and a luminance loss in the polarized glasses are small, and it is possible to increase the rate of utilization of light. As there is no need for a configuration for the time division or a configuration of aligning the polarization directions of luminous fluxes, it is possible to display a stereoscopic image with a compact configuration.

Furthermore, as a stereoscopic viewing can be easily enabled by changing the arrangement of the pixels 4L and 4R and disposing the retardation layers 5, it is possible to appropriate most of the components of a heretofore known three-panel type projector which is not for stereoscopic viewing.

Second Embodiment

Next, a description will be given, based on the drawings, of a second embodiment of the invention.

In the following description, structures similar to and members identical to those of the first embodiment will be given the same reference numerals and characters, and a detailed description thereof will be omitted or simplified. In the embodiment, the arrangements of the pixels 4L and 4R and retardation layers 5 differ from those of the first embodiment, and the other portions are the same as those of the first embodiment.

Configuration of Liquid Crystal Panels

Figure 7A:
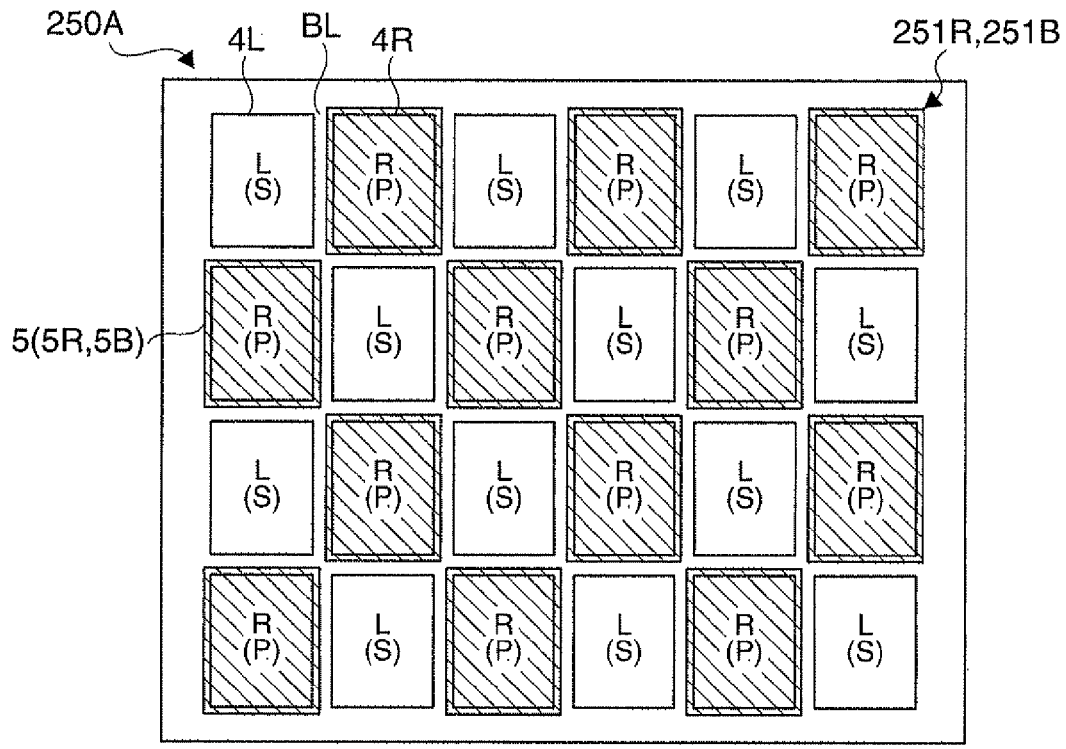
FIGS. 7A and 7B are schematic plan views of configurations of optical modulation devices according to a second embodiment.
Figure 7B:
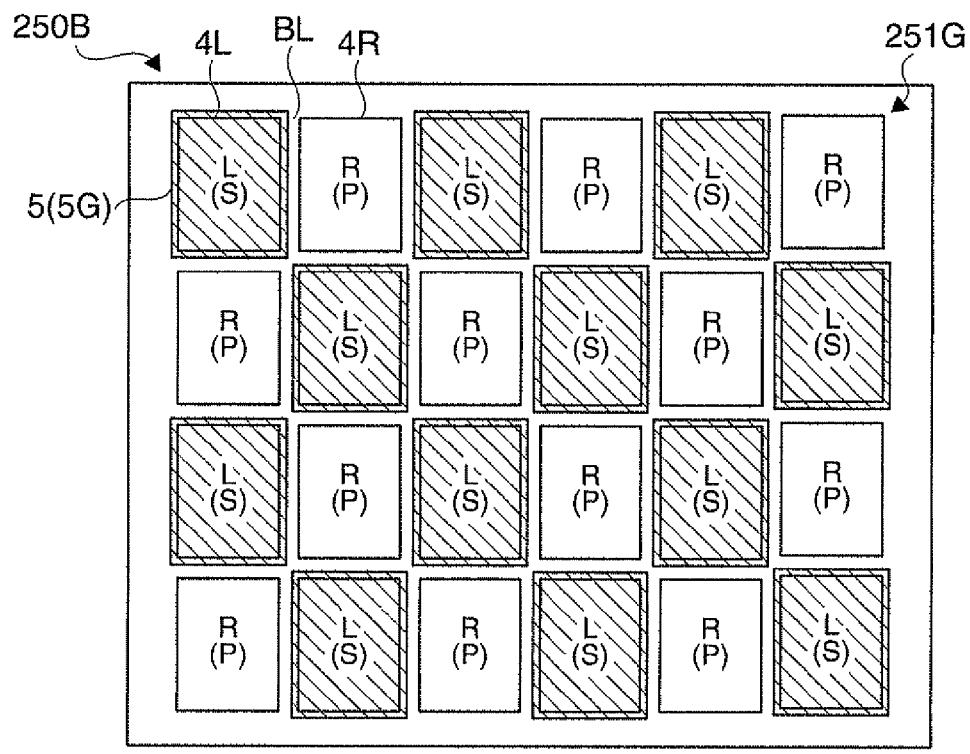

FIGS. 7A and 7B are schematic plan views of configurations of the optical modulation devices 250A and 250B. Specifically, FIG. 7A is a view of the first optical modulation device 250A, and FIG. 7B is a view of the second optical modulation device 250B. The arrangement of the pixels 4L and 4R and the arrangement of the retardation layers 5R and 5B in the first optical modulation device 250A are the same as those of the first embodiment.

In the liquid crystal panel 251G of the embodiment, as shown in FIG. 7B, the arrangement of the pixels 4R and 4L is the reverse of that of the first embodiment. That is, the liquid crystal panel 251G has the same arrangement of the pixels 4L and 4R as the liquid crystal panels 251R and 251B.

Configuration of Retardation Layers

The retardation layers 5G of the embodiment are provided on the light emission side of the pixels 4L in the liquid crystal panel 251G, as shown in FIG. 7B.

As the liquid crystal panels 251R and 251B and liquid crystal panel 251G have the same disposition of the pixels 4L and 4R, as previously described, the arrangement of the retardation layers 5R and 5B and the arrangement of the retardation layers 5G are the reverse of each other, as shown in FIGS. 7A and 7B.

It is sufficient that the panel drive unit 291C drives the liquid crystal panel 251G based on the G signal in such a way that the panel attains the arrangement of the pixels 4L and 4R shown in FIG. 7B.

In the embodiment too, a transmission or block of the pixels through or by the polarized glasses 3 is in the relationship shown in FIGS. 6A and 6B.

Consequently, as the images for left eye are observed with only the left eye of the observer, and the images for right eye are observed with only the right eye of the observer, the observer can view the stereoscopic image.

According to the second embodiment, apart from advantages the same as those of the first embodiment, there is the following advantage.

In the embodiment, as the arrangement of the pixels 4R and 4L, in one of the three liquid crystal panels 251R, 251G, and 251B is the same as that in another, it is sufficient that the panel drive unit 291C drives each liquid crystal panel 251 in the same way.

The invention not being limited to the previously described embodiments, modifications, improvements, or the like, within a range in which the object of the invention can be achieved are incorporated in the invention.

In each previously described embodiment, each liquid crystal panel 251 is such that the pixels 4L and 4R are alternately arranged in the row direction and column direction, but is not limited to this.

Figure 8A:
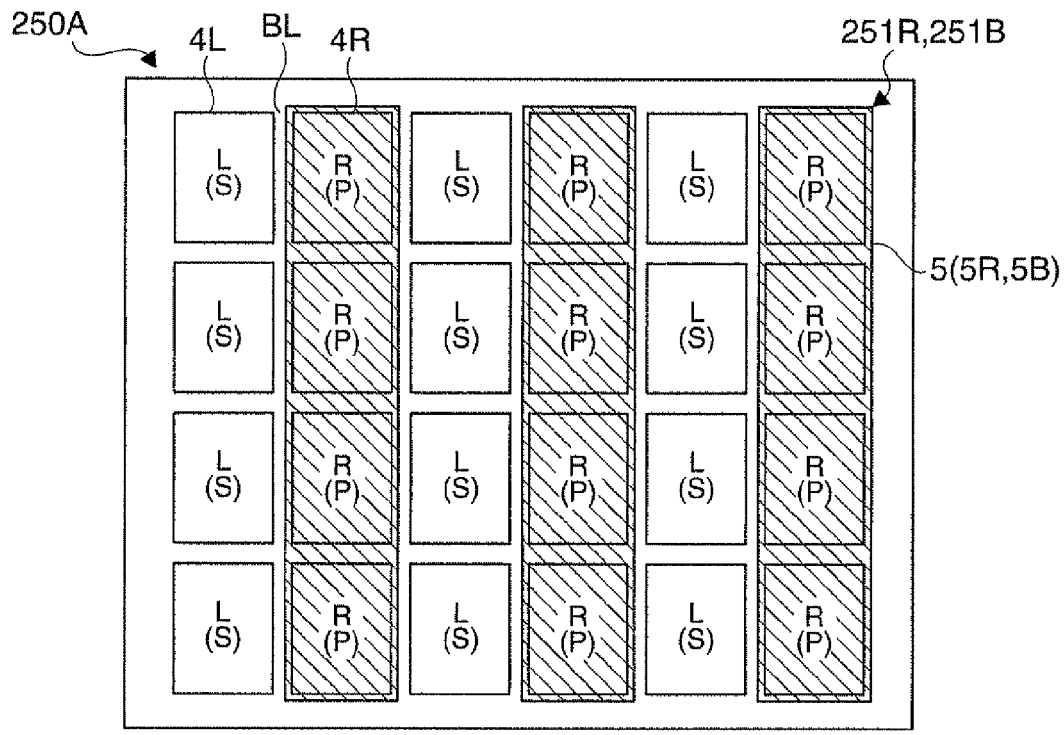
FIGS. 8A and 8B are schematic plan views of configurations of optical modulation devices according to a modification example.
Figure 8B:
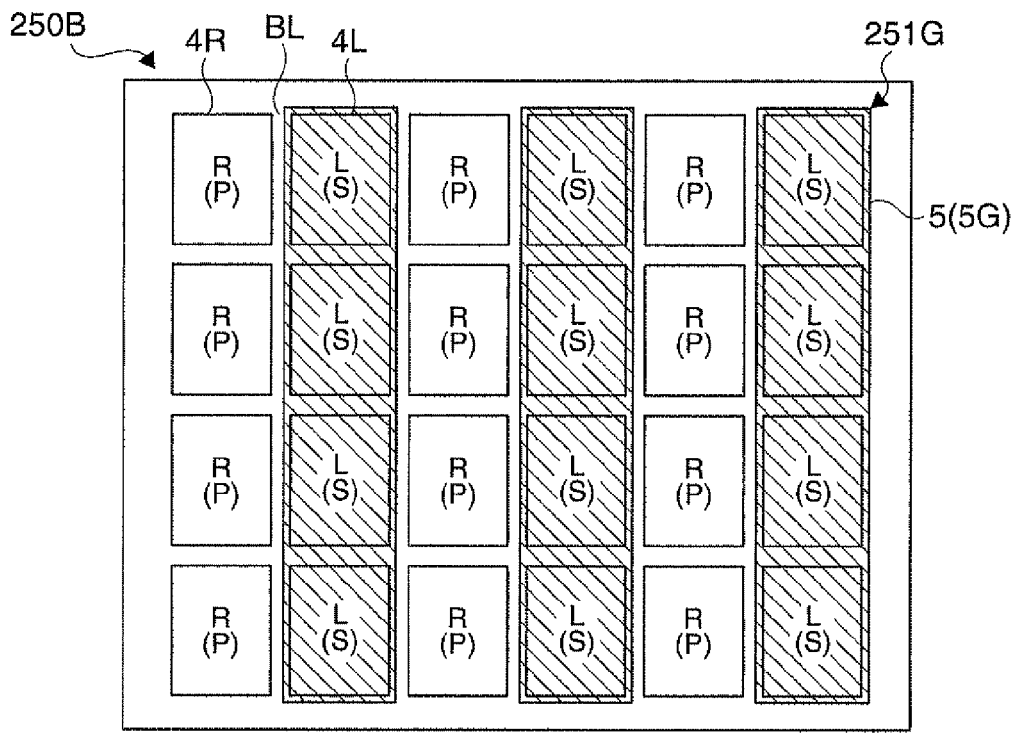
Figure 9A:
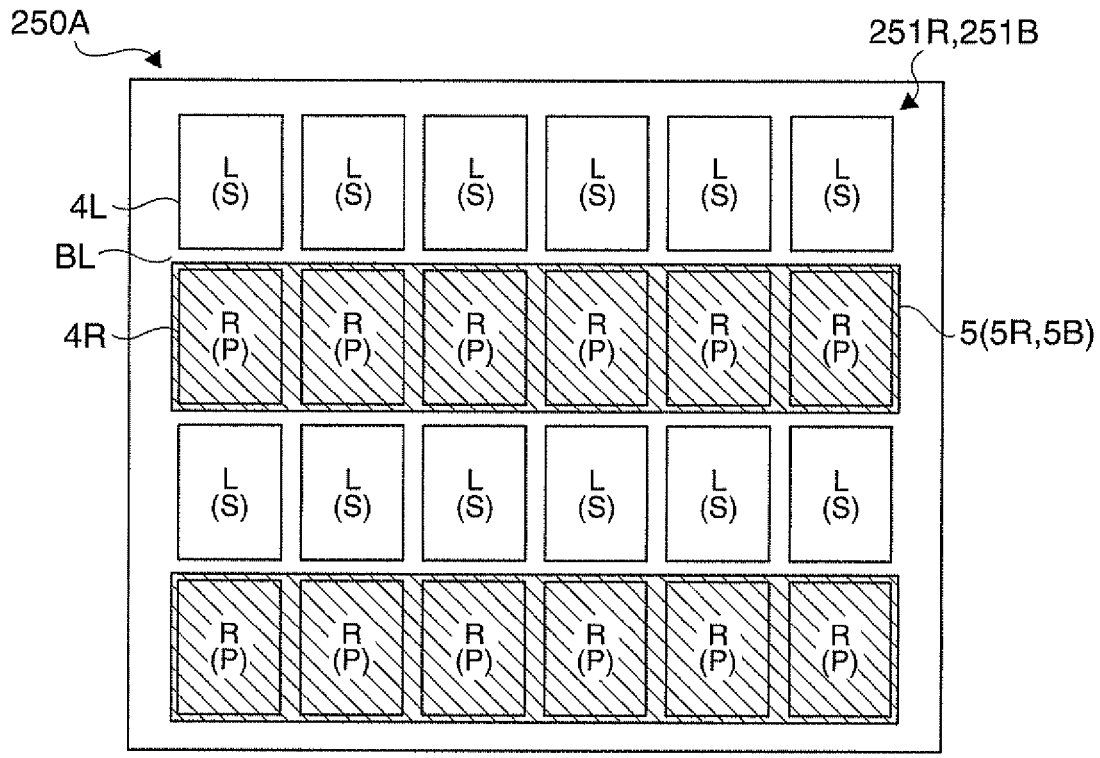
FIGS. 9A and 9B are schematic plan views of configurations of optical modulation devices according to a modification example.
Figure 9B:
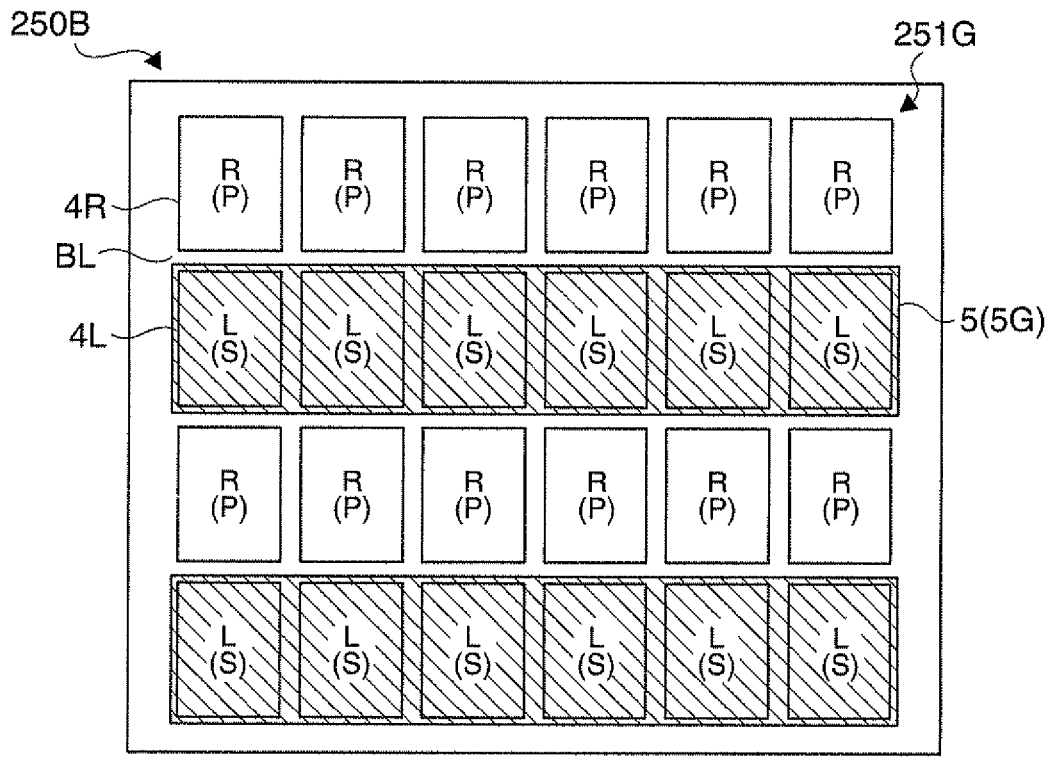

FIGS. 8A, 8B, 9A, and 9B are schematic plan views of configurations of optical modulation devices in modification examples. Specifically, FIGS. 8A and 9A are views of the first optical modulation device 250A, and FIGS. 8B and 9B are views of the second optical modulation device 250B. As shown in FIGS. 8A and 8B, the pixels 4L and 4R may be alternately arranged in a stripe form in the column direction. Also, as shown in FIGS. 9A and 9B, the pixels 4L and 4R may be alternately arranged in a stripe form in the row direction. In accordance with this, it is sufficient to form the retardation layers 5 in a line form extending in the row direction or column direction, as shown in FIGS. 8A, 8B, 9A, and 9B, meaning that it is easy to create the retardation layers 5.

The modification examples may be applied to the second embodiment.

In each previously described embodiment, the retardation layers 5, as shown in FIG. 3, are directly disposed on each of the color light emission surfaces of the optical modulation devices 250A and 250B but, not being limited to this, the retardation layers 5 may be formed on one transparent film in the arrangement shown in FIGS. 4A and 4B, or the like, and the transparent film disposed on the color light emission side of each of the optical modulation devices 250A and 250B.

In each previously described embodiment, the retardation layers 5R and 5B and retardation layers 5G are disposed on the color light emission surfaces of the ½ wavelength plates 254R and 254B and emission side polarizing plate 253G respectively, but it is sufficient that these retardation layers 5 are disposed on the color light emission side of the pixels 4L and 4R in the corresponding liquid crystal panels 251 and, for example, the retardation layers 5 may be disposed between each corresponding liquid crystal 251 and each corresponding emission side polarizing plate 253.

In each previously described embodiment, the image display apparatus according to some aspects of the invention is configured as an image display apparatus allowing the observer to view the projection image stereoscopically, but is not limited to this. The image display apparatus may be configured as, for example, a dual display apparatus which, the first image light and second image light being made image lights with differing contents, projects two image lights and displays two projection images.

When the image display apparatus is configured as this kind of duel display apparatus, as the polarized glasses 3, it is sufficient to provide two kinds; polarized glasses provided with the polarizing film for left eyes 31 on the right and left, and polarized glasses provided with the polarizing film for right eyes 32 on the right and left.

In each previously described embodiment, as the image display apparatus 1, only an example is given in which is employed a front projection type projector 2, but the invention may adopt a configuration wherein a rear type projector which, including a screen, carries out a projection from the rear side of the screen is employed.

The invention can be applied to an image display apparatus which causes an image to be viewed stereoscopically using a projector and polarized glasses.

What is claimed is:

1. An image display apparatus comprising:
 a first optical modulation device and a second optical modulation device configured to emit an image light formed as linearly polarized lights whose polarization directions are perpendicular to each other, the first optical modulation device and the second optical modulation device include;
 first pixels forming a first image light and second pixels forming a second image light arranged in at least one direction in each of the first optical modulation device and the second optical modulation device; and
 retardation layers disposed on the light emission side of the first pixels or second pixels, the retardation layers configured to convert one linearly polarized light of the linearly polarized lights into the other linearly polarized light, wherein
 an arrangement of the first pixels and the second pixels in the first optical modulation device is set so as to be the reverse of an arrangement of the first pixels and the second pixels in the second optical modulation device, and
 arrangements of the retardation layers in the first optical modulation device and the second optical modulation device are set so as to be the same as each other, wherein
 a light emitted from the second pixels on the first optical modulation device side and a light emitted from the first pixels on the second optical modulation device side is converted in polarization direction by the retardation layers and emitted.

2. The image display apparatus according to claim 1, wherein
 the first pixels and the second pixels are alternately arranged in a row direction and column direction.

3. The image display apparatus according to claim 1, further comprising:
 a display apparatus main body including the first optical modulation device, the second optical modulation device, and a display control device configured to control the actions of the first optical modulation device and the second optical modulation device; and
 an image selection device being configured separately from the display apparatus main body, has a first transmission portion through which the first image light is transmitted and a second transmission portion through which the second image light is transmitted.

4. The image display apparatus according to claim 1, further comprising:
 a cross-dichroic prism,
  the first optical modulation device transmitting and emitting light through the cross-dichroic prism, and
  the second optical modulation device reflecting, bending and emitting the light transmitted and emitted through the first optical modulation device.

5. The image display apparatus according to claim 1, wherein
 the first optical modulation device is provided with a ½ wavelength plate.

6. An image display apparatus comprising:
 a first optical modulation device and a second optical modulation device configured to emit an image light formed as linearly polarized lights whose polarization directions are perpendicular to each other, the first optical modulation device and the second optical modulation device include;
 first pixels forming a first image light and second pixels forming a second image light arranged in at least one direction in each of the first optical modulation device and the second optical modulation device; and
 retardation layers disposed on the light emission side of the first pixels or second pixels, the retardation layers configured to convert one linearly polarized light of the linearly polarized lights into the other linearly polarized light, wherein
 an arrangement of the first pixels and the second pixels in the first optical modulation device is set so as to be the same as an arrangement of the first pixels and the second pixels in the second optical modulation device, and arrangements of the retardation layers in the first optical modulation device and second optical modulation device are set so as to be the reverse of each other, wherein a light emitted from the second pixels on the first optical modulation device side and a light emitted from the first pixels on the second optical modulation device side is converted in polarization direction by the retardation layers and emitted.

7. The image display apparatus according to claim 6, wherein the first pixels and the second pixels are alternately arranged in a row direction and column direction.

8. The image display apparatus according to claim 6, further comprising:

a display apparatus main body including the first optical modulation device, the second optical modulation device, and a display control device configured to control the actions of the first optical modulation device and second optical modulation device; and an image selection device being configured separately from the display apparatus main body, has a first transmission portion through which the first image light is transmitted and a second transmission portion through which the second image light is transmitted.

* * * * *